(12) United States Patent
Remäng et al.

(10) Patent No.: US 12,275,439 B2
(45) Date of Patent: Apr. 15, 2025

(54) METHOD FOR DEACTIVATION

(71) Applicant: MERCEDES-BENZ GROUP AG, Stuttgart (DE)

(72) Inventors: Albin Remäng, Gothenburg (SE); Burkhard Siber, Sindelfingen (DE)

(73) Assignee: MERCEDES-BENZ GROUP AG, Stuttgart (DE)

(*) Notice: Subject to any disclaimer, the term of this patent is extended or adjusted under 35 U.S.C. 154(b) by 209 days.

(21) Appl. No.: 17/792,218

(22) PCT Filed: Dec. 10, 2020

(86) PCT No.: PCT/EP2020/085537
§ 371 (c)(1),
(2) Date: Jul. 12, 2022

(87) PCT Pub. No.: WO2021/144081
PCT Pub. Date: Jul. 22, 2021

(65) Prior Publication Data
US 2023/0047479 A1    Feb. 16, 2023

(30) Foreign Application Priority Data
Jan. 13, 2020   (DE) .................... 10 2020 000 147.5

(51) Int. Cl.
*B60W 60/00*          (2020.01)
*B60W 30/095*         (2012.01)
(Continued)

(52) U.S. Cl.
CPC .... *B60W 60/0054* (2020.02); *B60W 30/0956* (2013.01); *B60W 40/08* (2013.01);
(Continued)

(58) Field of Classification Search
CPC ......... B60W 60/0054; B60W 60/0059; B60W 2540/10; B60W 2540/225;
(Continued)

(56) References Cited

U.S. PATENT DOCUMENTS

| 10,766,497 B2 | 9/2020 | Braunagel et al. |
| 11,385,639 B2 | 7/2022 | Ichikawa et al. |

(Continued)

FOREIGN PATENT DOCUMENTS

| DE | 102006057842 A1 | 6/2008 |
| DE | 102016007187 A1 | 6/2017 |

(Continued)

OTHER PUBLICATIONS

International Search Report mailed Mar. 10, 2021 in related/corresponding International Application No. PCT/EP2020/085537.

(Continued)

*Primary Examiner* — Tiffany P Young
*Assistant Examiner* — John D Holman
(74) *Attorney, Agent, or Firm* — PATENT PORTFOLIO BUILDERS PLLC

(57) ABSTRACT

An automated driving mode of a vehicle is automatically terminated if, due to a manual steering torque acting on the steering wheel of the vehicle, a system steering torque generated by a control system of an assistance system for automated driving mode in terms of amount is exceeded by a predetermined first value if at least one hand of a vehicle user is detected on the steering wheel of the vehicle, is exceeded by a predetermined second value if neither of the vehicle user's hands is detected on the steering wheel, or is exceeded by a predetermined third value if it is determined that the vehicle user is distracted from the driving situation, or if it is determined that there is a lateral collision risk for (Continued)

Figure 1:
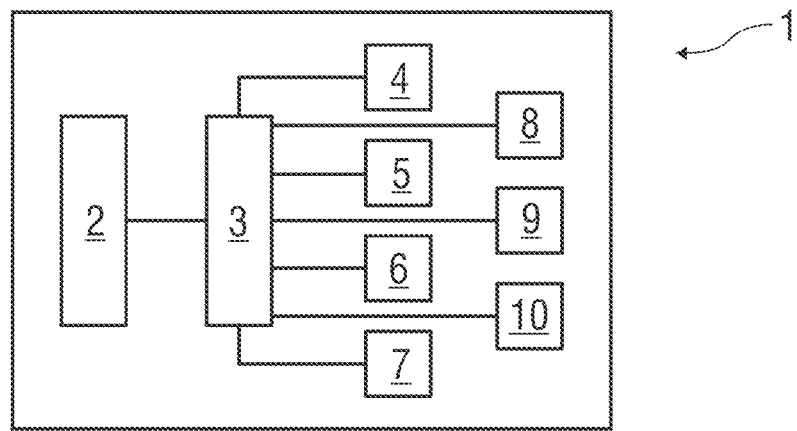

the vehicle and the manual steering torque of the vehicle user is acting in the direction of the collision risk.

10 Claims, 1 Drawing Sheet

(51) Int. Cl.
  *B60W 40/08* (2012.01)
  *B60W 50/10* (2012.01)
(52) U.S. Cl.
  CPC ........ *B60W 50/10* (2013.01); *B60W 60/0059* (2020.02); *B60W 2540/10* (2013.01); *B60W 2540/225* (2020.02); *B60W 2540/229* (2020.02)
(58) Field of Classification Search
  CPC ....... B60W 2540/229; B60W 30/0956; B60W 40/08; B60W 50/10
  USPC .......................................................... 701/23
  See application file for complete search history.

(56) References Cited

U.S. PATENT DOCUMENTS

| | | | |
|---|---|---|---|
| 11,565,713 | B2 | 1/2023 | Mimura et al. |
| 2016/0280235 | A1* | 9/2016 | Sugaiwa ............... B60W 50/10 |
| 2017/0261981 | A1 | 9/2017 | Ichikawa et al. |
| 2018/0370542 | A1* | 12/2018 | Braunagel ............ B60W 50/10 |
| 2019/0286127 | A1* | 9/2019 | Watanabe ............ B62D 15/025 |
| 2019/0300013 | A1 | 10/2019 | Shiraishi et al. |
| 2021/0080949 | A1 | 3/2021 | Takeda et al. |
| 2021/0269089 | A1 | 9/2021 | Kuenzner |

FOREIGN PATENT DOCUMENTS

| | | |
|---|---|---|
| DE | 102019202198 A1 | 9/2019 |
| DE | 102018210320 A1 | 1/2020 |
| EP | 2253499 A1 | 11/2010 |
| EP | 3072766 A2 | 9/2016 |
| JP | 2017019436 A | 1/2017 |
| JP | 2019156232 A | 9/2019 |
| WO | 2018220834 A1 | 12/2018 |
| WO | 2019188587 A1 | 10/2019 |
| WO | 2020001697 A1 | 1/2020 |

OTHER PUBLICATIONS

Office Action created Nov. 10, 2020 in related/corresponding DE Application No. 10 2020 000 147.5.

Written Opinion mailed Mar. 10, 2021 in related/corresponding International Application No. PCT/EP2020/085537.

Office Acton dated Aug. 8, 2023 in related/corresponding JP Application No. 2022-543018.

* cited by examiner

METHOD FOR DEACTIVATION

BACKGROUND AND SUMMARY OF THE INVENTION

Exemplary embodiments of the invention relate to a method for deactivating an automated driving mode of a vehicle.

DE 10 2006 057 842 A1 discloses a method for supporting the driver of a vehicle during lateral control of the vehicle and a driver assistance system for carrying out the method. The method involves recording the surroundings of the vehicle in order to detect objects in the surroundings of the vehicle and/or the course of a lane of traffic being driven along by the vehicle. A lateral control system intervention for the generation of a course-correcting system yaw torque or a course-correcting system yaw rate is triggered when there is the risk that the vehicle could collide with one of the detected objects or could leave the detected lane of traffic. The driver can interrupt the lateral control system intervention by actuating the steering wheel of the vehicle, the accelerator pedal of the vehicle, and/or the brake pedal of the vehicle if the extent of the respective actuation differs in terms of amount from a reference value allocated to the respective actuation by more than a predetermined degree of tolerance.

Exemplary embodiments of the invention are directed to a method for deactivating an automated driving mode of a vehicle.

According to the invention, a method for deactivating an automated driving mode of a vehicle provides that a first value, a second value, and a third value are predetermined as thresholds in such a way that the second value is greater than the first value and the third value is greater than the second value, and that the automated driving mode is automatically terminated, if, by means of a manual steering torque acting on the steering wheel of the vehicle, a system steering torque generated by a control system of an assistance system for the automated driving mode is exceeded in terms of amount by the predetermined first value, if at least one hand of a vehicle user is detected on the steering wheel of the vehicle.

This means that the automated driving mode is terminated if the steering wheel is actuated if the vehicle user has at least one hand on the steering wheel, in particular grips the steering wheel with at least one hand, and the steering wheel is actuated to such an extent as a result of this that the manual steering torque is greater in terms of amount than the system steering torque by at least the predetermined first value.

Manual steering torque means any torque applied to the steering wheel by the vehicle user, regardless of whether the vehicle user generates the torque with his/her hand, arm, leg or by touching the steering wheel in another way. System steering torque generated by the control system means a steering torque applied to a steering system of the vehicle by the control system during the automated driving mode to control the automated driving mode.

However, the automated driving mode is also automatically terminated if, by means of the manual steering torque, the system steering torque is exceeded in terms of amount by the predetermined second value if neither of the vehicle user's hands is detected on the steering wheel.

This means that the automated driving mode is also terminated in the event of steering wheel actuation if the vehicle user does not have a hand on the steering wheel, in particular does not grip the steering wheel with either of his/her hands, and the steering wheel is actuated to such an extent as a result of this that the manual steering torque is greater in terms of amount than the system steering torque by at least the predetermined second value.

The automated driving mode is then also terminated, or, if by means of the manual steering torque the system steering torque is exceeded in terms of amount by the predetermined third value, if it is determined that the vehicle user is distracted from the driving situation, or that there is a lateral collision risk for the vehicle and the manual steering torque of the vehicle user is acting in the direction of the collision risk.

This means that the automated driving mode is then also terminated if the steering wheel is actuated if the vehicle user is distracted from the driving situation, or if there is a lateral collision risk in the direction of action of the manual torque and the steering wheel is actuated to such an extent as a result of this that the manual steering torque is greater in terms of amount than the system steering torque by at least the predetermined third value.

By applying the method, the vehicle user has the option to terminate the automated driving mode of the vehicle substantially at any time in order to assume vehicle guidance, i.e., a driving task. The vehicle user assumes the vehicle guidance by performing a specific action, wherein it is ensured to the greatest possible extent that an unintentional and/or accidental action by the vehicle user does not result in deactivation of the automated driving mode.

In order to be able to ensure to the greatest possible extent that an action by the vehicle user is intended and not carried out randomly, one embodiment of the method provides that the automated driving mode is only terminated if the respective exceedance in terms of amount of the system steering torque lasts longer than a predetermined period of time. This means that the system steering torque exceedance in terms of amount by the manual steering torque by the first, second, or third value is only considered to exist if the respective exceedance lasts longer than the predetermined period of time. Short-term exceedances are therefore not taken into account. By taking into account the duration of the respective exceedance, it can be determined whether the vehicle user has actuated the steering wheel by mistake or whether the vehicle user has intended to terminate the automated driving mode.

In order to detect the effective manual steering torque, in one development a manual steering torque detection unit is connected to the steering wheel of the vehicle by means of signals, so that the manual steering torque acting on the steering wheel is determined based on the detected signals of the manual steering torque detection unit. Such manual steering torque detection unit is a component of at least one assistance system present in the vehicle, in particular a lane departure warning system, so that it can be used to perform the method.

To detect at least one of the vehicle user's hands on the steering wheel, a further embodiment has at least one capacitive detection unit arranged on the steering wheel, which continuously detects signals, by means of which it is detected whether at least one of the vehicle user's hands is on the steering wheel. In particular, the capacitive detection unit detects gripping of the steering wheel. This capacitive detection unit is also a vehicle component and is used to ensure safety, since if it is detected that the vehicle user is not holding the steering wheel with at least one of his/her hands, a corresponding warning is emitted in the vehicle.

In a further possible embodiment of the method, a direction of gaze and/or a head orientation of the vehicle user is/are determined based on the detected signals of a driver observation camera, wherein such a driver observation camera is often present in the vehicle, so that it is not necessary to additionally arrange a driver observation camera in the vehicle in order to perform the method.

In a further embodiment, a lateral collision risk for the vehicle is detected based on the detected signals of an environment sensor system of the vehicle, wherein the environment sensor system continuously detects signals, in particular in automated driving mode, and forms an essential component of an assistance system for the automated driving mode of the vehicle. In particular, an environment of the vehicle and objects located in it are detected based on the detected signals of the environment sensor system.

In addition, the detected signals of the environment sensor system are used to determine whether a potential collision object is located in or is entering a safety area of a longitudinal side of the vehicle, wherein the automated driving mode of the vehicle is terminated if a lateral collision risk is determined.

Furthermore, in one embodiment, the method provides that the automated driving mode is terminated if at least one hand on the steering wheel and an actuation of an accelerator pedal are detected, wherein the actuation of the accelerator pedal exceeds a predetermined minimum duration. By requiring the accelerator pedal to be actuated for the predetermined minimum duration, accidental actuation can be ruled out and the automated driving mode can be terminated, with the vehicle user subsequently performing the driving task with respect to the vehicle.

If it is detected that neither of the vehicle user's hands are on the steering wheel, the actuation of the accelerator pedal is not interpreted as a desire to accelerate, so that the order to accelerate signaled by the actuation of the accelerator pedal is not implemented.

Similarly, the automated driving mode is terminated if at least one hand on the steering wheel and an actuation of a brake pedal are detected, wherein the actuation of the brake pedal exceeds a predetermined minimum duration. Here, too, it can therefore be ruled out that the brake pedal was inadvertently actuated.

If the vehicle user actuates an actuating element to deactivate the automated driving mode for a predetermined minimum duration, the automated driving mode of the vehicle is deactivated and accidental actuation of this actuating element can be largely ruled out.

BRIEF DESCRIPTION OF THE DRAWING FIGURES

Exemplary embodiments of the invention are explained in more detail below by means of drawings.

Figure 2:
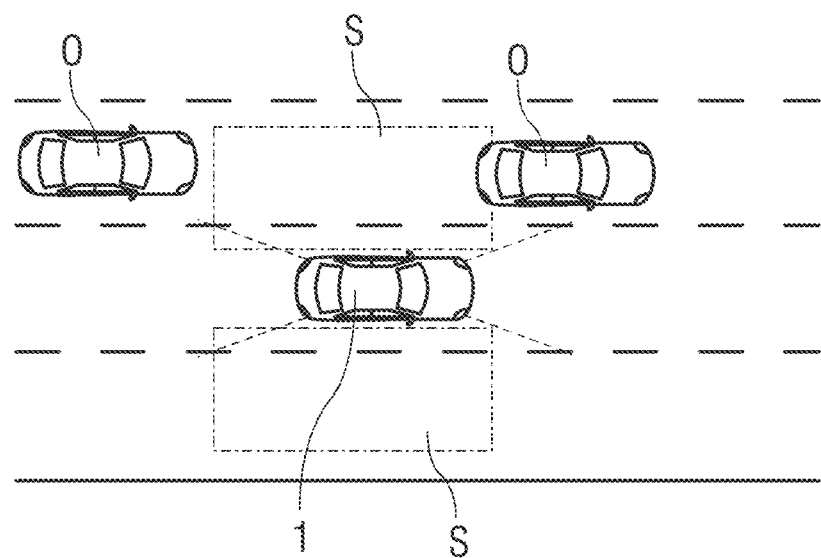

Here are shown:

FIG. 1 in diagram form, a device for deactivating an automated driving mode of a vehicle and FIG. 2 in diagram form, a traffic situation in which the automated driving mode is deactivated.

Corresponding parts are marked with the same reference numerals in all figures.

DETAILED DESCRIPTION

FIG. 1 illustrates a device for performing a method for deactivating an automated driving mode of a vehicle 1.

The device comprises an assistance system 2 for the automated driving mode, in which the full responsibility for a driving task of the vehicle 1 is transferred to the vehicle 1, wherein a vehicle user of the vehicle 1 can then carry out another activity.

The assistance system 2 is connected to a control system 3, which is connected to a manual steering torque detection unit 4, a capacitive detection unit 5, a driver observation camera 6, an environment sensor system 7, an accelerator pedal 8, a brake pedal 9, and an actuating element 10 to terminate the automated driving mode.

In the automated driving mode of the vehicle 1, the vehicle user must be given the option to assume vehicle control at any time, i.e., to terminate the automated driving mode.

In order to terminate the automated driving mode, it is necessary for the vehicle user to perform at least one specific action, wherein for this purpose it must be ensured as far as possible that an unintentional and/or accidentally performed action by the vehicle user does not result in deactivation of the automated driving mode. A method described below is provided for this purpose.

By means of the manual steering torque detection unit 4, signals are detected, in particular in the automated driving mode, based on which a manual steering torque acting on a steering wheel of the vehicle 1 is determined. The steering wheel is a component of a steering system of the vehicle 1 provided for lateral control of the vehicle 1.

By means of the capacitive detection unit 5, known as a hands-on sensor system, signals are continuously detected, wherein it is determined based on these whether at least one hand of the vehicle user is in contact with the steering wheel.

The driver observation camera 6 is integrated, for example, into an interior mirror of the vehicle 1, wherein a detection range of the driver observation camera 6 is angled in such a way that at least a vehicle user's head is located in the detection range. By means of the driver observation camera 6, signals are continuously detected, based on which a direction of gaze and/or a head orientation of the vehicle user is determined, so that it can be derived from this whether the vehicle user is following traffic events in front of the vehicle 1 and to the side of the vehicle 1.

By means of the environment sensor system 7, which comprises sensors arranged in and/or on the vehicle 1, signals are continuously detected during driving mode, based on which an environment of the vehicle 1, and objects 0 located in this environment and shown in more detail in FIG. 2, are detected. The environment sensor system 7 and, in particular, the signals detected by it are thus used to determine a lateral collision risk for the vehicle 1. For example, the environment sensor system 7 is a component of a so-called blind spot assistant for this purpose.

By means of the control system 3, a system steering torque is generated at the steering system of the vehicle 1 for lateral control of the vehicle 1 in automated driving mode, wherein the control system 3 is also provided for generating actuating signals for longitudinal control.

During the automated driving mode of the vehicle 1, it is continuously checked whether one of the scenarios described below exists.

In a first scenario, it is determined based on the detected signals of the capacitive detection unit 5 that at least one of the vehicle user's hands is in contact with the steering wheel of the vehicle 1.

Based on detected signals of the manual steering torque detection unit 4, it is detected that a manual steering torque acting on the steering wheel by means of at least one hand exceeds the system steering torque generated by means of the control system 3 by a predetermined first value. In particular, the system steering torque is comparatively easily exceeded by the manual steering torque. For example, the predetermined first value, which can also be referred to as the override threshold, is 3 Newton meters.

If the first scenario described occurs, the automated driving mode is terminated and the driving task is transferred to the vehicle user.

In a second scenario, it is determined based on the detected signals of the capacitive detection unit 5 that neither of the vehicle user's two hands is in contact with the steering wheel and, based on the detected signals of the manual steering torque detection unit 4, it is determined that the acting manual steering torque exceeds the system steering torque in terms of amount by a second value predetermined for this case of, e.g., 6 Newton meters.

If this second scenario is detected, the automated driving mode is deactivated and vehicle control is transferred to the vehicle user.

In a third scenario, it is determined based on the detected signals of the driver observation camera 6 that the vehicle user is distracted and is not paying attention to traffic in front of the vehicle 1.

In addition, a determined manual steering torque exceeds the system steering element in terms of amount by a predetermined third value of, for example, 8 Newton meters. Here, the predetermined third value is greater than the predetermined first value and greater than the predetermined second value, and the automated driving mode is terminated.

In a fourth scenario, it is determined based on the detected signals of the environment sensor system 7 that there is a lateral collision risk for the vehicle 1, wherein it is detected based on the detected signals of the manual steering torque detection unit 4 that the manual steering torque is acting in the direction of the detected lateral collision risk. Here, the manual steering torque exceeds the system steering element in terms of amount by a predetermined fourth value.

This predetermined fourth value, which represents a defined override threshold, is, according to the fourth scenario, greater than the predetermined first value, wherein the predetermined fourth value is greater in relation to a longitudinal side of the vehicle at risk of collision than to a longitudinal side of the vehicle not at risk of collision.

For example, the predetermined fourth value, which is determined for the longitudinal side of the vehicle at risk of collision, corresponds to the predetermined third value, e.g., 8 Newton meters.

In a possible embodiment of the fourth scenario, the predetermined fourth value on the longitudinal side of the vehicle not at risk of collision corresponds at least to the predetermined second value, of e.g., 6 Newton meters.

The lateral collision risk for the vehicle 1 is detected in particular by specifying a safety area S for each longitudinal side of the vehicle, as shown in FIG. 2.

A length of the respective safety area S is selected to be greater than a vehicle length, wherein, in order to detect the risk of collision, it is determined based on the detected signals of the environment sensor system 7 whether an object O, in particular a further vehicle 1, is located within the safety areas S, or whether an object O moves into one of the lateral safety areas S within a predetermined period of time, for example within 2 seconds, i.e., in particular drives into it.

If, according to the fourth scenario, an existing lateral collision risk for the vehicle 1 is determined and the manual steering torque acts as described above, the automated driving mode of the vehicle 1 is deactivated and therefore terminated, so that the vehicle user performs the driving task.

For all four scenarios described in order to deactivate the automated driving mode of the vehicle 1, it is necessary for the manual steering torque to exceed the system steering element for a predetermined period of time by the respective predetermined value. This time period can be individually predetermined for the respective scenario.

As an alternative to predetermining the time duration, it can be provided that a power applied by the manual steering torque must be exceeded by a power threshold predetermined for a respective scenario. For example, the power threshold for the first, third, and fourth scenario can be selected higher than for the second scenario. This means that brief manual steering interventions by the vehicle user can be disregarded, as a brief steering intervention is usually an unintentional steering intervention.

In addition to the above-mentioned scenarios, in the automated driving mode of the vehicle 1 it is continuously checked whether one of the predetermined further scenarios below exists. If it is determined that one of these predetermined further scenarios exists, the automated driving mode of the vehicle 1 is also terminated.

In a first further scenario, it is determined based on detected signals of the capacitive detection unit 5 that at least one of the vehicle user's hands is in contact with the steering wheel, wherein an actuation of the accelerator pedal 8 is also detected. In order to be able to rule out as far as possible that the automated driving mode is deactivated if the vehicle user has only touched the accelerator pedal 8 inadvertently, it is provided that the accelerator pedal 8 must be actuated for a predetermined minimum duration.

In a second further scenario, it is determined based on detected signals of the capacitive detection unit 5 that at least one of the vehicle user's hands is in contact with the steering wheel, wherein an actuation of the brake pedal 9 is also detected. In order to be able to rule out as far as possible that the automated driving mode is deactivated if the vehicle user has only touched the brake pedal 9 inadvertently, it is also specified here that the brake pedal 9 must be actuated for a predetermined minimum duration.

The fact that the brake pedal 9 must be actuated for the predetermined minimum duration in order to deactivate the automated driving mode is only a prerequisite if there is no previously determined collision risk for the vehicle 1.

An emergency situation that poses a risk of collision exists, for example, if the time it takes until a collision occurs when the vehicle 1 is not braked is less than a predetermined time threshold, in particular a predetermined time value.

A third further scenario for deactivating the automated driving mode of the vehicle 1 specifies that, for this purpose, an actuating element 10 for deactivating the automated driving mode is actuated by the vehicle user for a predetermined minimum duration. However, this situation only applies if there is no emergency situation in which there is emergency braking of the vehicle 1 in order to avoid collision.

According to a fourth further scenario, the automated driving mode is terminated if it is detected that at least one of the vehicle user's hands is in contact with the steering wheel and it is determined that the vehicle user is observing traffic events in front of the vehicle 1.

In automated driving mode, if it is determined that neither of the vehicle user's hands is on the steering wheel and the accelerator pedal 8 is actuated, this actuation is not interpreted as an order to accelerate. In other words, the order to accelerate indicated by the accelerator pedal actuation is not implemented.

A brake pedal actuation, on the other hand, can be interpreted at any time as a desire to brake, even in situations in which no hand is detected on the steering wheel.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for deactivating an automated driving mode of a vehicle, the method comprising:
    determining a manual steering torque acting on a steering wheel of the vehicle;
    determining a system steering torque, wherein the system steering torque is generated by a control system during the automated driving mode of the vehicle;
    detecting whether at least one of a vehicle user's hands is on the steering wheel;
    determining whether the vehicle user's gaze or head orientation is not directed towards the front of the vehicle or determining whether there is a lateral collision risk for the vehicle and a direction of the collision risk;
    automatically terminating the automated driving mode when the at least one of the vehicle user's hands is detected on the steering wheel and the manual steering torque exceeds the system steering torque by an amount of a first predetermined value;
    automatically terminating the automated driving mode when neither of the vehicle user's hands are detected on the steering wheel and the manual steering torque exceeds the system steering torque by an amount of a second predetermined value;
    automatically terminating the automated driving mode when the manual steering torque exceeds the system steering torque by an amount of a third predetermined value and it is determined that the vehicle user's gaze or head orientation is not directed towards the front of the vehicle; and
    automatically terminating the automated driving mode when the manual steering torque exceeds the system steering torque by the amount of the third predetermined value and it is determined that there is the lateral collision risk for the vehicle and the manual steering torque is acting in the direction of the collision risk,
    wherein the second predetermined value is greater than the first predetermined value and the third predetermined value is greater than the second predetermined value.

2. The method of claim 1, wherein the automated driving mode is only terminated if the exceedance of the system steering torque by the manual steering torque for a respective one of the first, second, and third predetermined values has a duration longer than a predetermined period of time.

3. The method of claim 1, the manual steering torque acting on the steering wheel is determined based on signals of a manual steering torque detection unit.

4. The method of claim 1, wherein whether at least one of the vehicle user's hands is on the steering wheel is detected based on signals of at least one capacitive detection unit arranged on the steering wheel.

5. The method of claim 1, wherein whether the vehicle user's gaze or head orientation is not directed towards the front of the vehicle is determined using signals of a driver observation camera indicating a direction of gaze or a head orientation of the vehicle user.

6. The method of claim 1, wherein whether there is the lateral collision risk is determined based on signals of an environment sensor system of the vehicle.

7. The method of claim 6, wherein, based on the signals of the environment sensor system, it is determined whether a potential collision object is located in or is entering a safety area of a longitudinal side of the vehicle.

8. The method of claim 1, wherein the automated driving mode is terminated if the at least one of the vehicle user's hand is on the steering wheel and an actuation of an accelerator pedal of the vehicle exceeds a predetermined minimum duration.

9. The method of claim 1, wherein the automated driving mode is terminated if the at least one of the vehicle user's hand is on the steering wheel and a brake pedal of the vehicle is actuated longer than a predetermined minimum duration.

10. The method of claim 1, wherein the automated driving mode is terminated if an actuating element to deactivate the automated driving mode is actuated for a predetermined minimum duration.

* * * * *